United States Patent
Puliatti et al.

(10) Patent No.: US 9,363,271 B1
(45) Date of Patent: Jun. 7, 2016

(54) METHOD AND SYSTEM OF RESERVING AND USING AN ACCESS CHANNEL

(75) Inventors: Dante Puliatti, Shawnee, KS (US); Samuel Schanker, Overland Park, KS (US); Steven Bedell, Leawood, KS (US); Michael Kovalcik, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 763 days.

(21) Appl. No.: 13/458,727

(22) Filed: Apr. 27, 2012

(51) Int. Cl.
*H04W 36/00* (2009.01)
*H04L 29/06* (2006.01)

(52) U.S. Cl.
CPC ..................... *H04L 63/105* (2013.01)

(58) Field of Classification Search
CPC ............ H04J 3/24; H04W 36/00; H04B 7/00; H04M 11/04
USPC .................. 455/437, 450, 453, 522
See application file for complete search history.

(56) References Cited

U.S. PATENT DOCUMENTS

| | | | |
|---|---|---|---|
| 6,545,995 B1 | 4/2003 | Kinnunen et al. | |
| 7,054,641 B1* | 5/2006 | Oxley et al. | 455/453 |
| 7,844,278 B1 | 11/2010 | Ross et al. | |
| 2005/0013281 A1* | 1/2005 | Milton et al. | 370/349 |
| 2006/0258369 A1* | 11/2006 | Burroughs et al. | 455/456.1 |
| 2009/0156215 A1* | 6/2009 | Pitkamaki | 455/437 |
| 2010/0112976 A1* | 5/2010 | Turina | 455/404.1 |
| 2012/0122512 A1* | 5/2012 | Nammi et al. | 455/522 |

* cited by examiner

*Primary Examiner* — Myron K Wyche

(57) ABSTRACT

A radio access network (RAN) may be providing, in a coverage area, at least two access channels that are available for use by any wireless communication devices (WCD). Thereafter, the RAN may detect that a threshold load exists in the coverage area and responsively reserve one of the access channels for use only by authorized WCDs. In turn, authorized WCDs in the coverage area may be configured to use the reserved access channel to transmit access probes to the RAN, while unauthorized WCDs in the coverage area may be configured to use only a generally-available access channel to transmit access probes to the RAN. In this way, the disclosed methods and corresponding devices may limit the occupancy on the reserved access channel and thereby increase the likelihood that authorized WCDs can successfully access the RAN over the reserved access channel when the coverage area becomes congested.

20 Claims, 4 Drawing Sheets

US 9,363,271 B1

METHOD AND SYSTEM OF RESERVING AND USING AN ACCESS CHANNEL

BACKGROUND

To provide cellular wireless communication service, a wireless service provider typically employs a radio access network (RAN) that functions to connect one or more wireless communication devices (WCDs) with one or more transport networks, such as the public switched telephone network (PSTN) and the Internet. In a typical RAN, an area is divided geographically into a number of coverage areas, such as cells and sectors, each defined by a radio frequency (RF) radiation pattern from a respective base transceiver station (BTS). Within each coverage area, the BTS's RF radiation pattern may provide one or more frequency channels over which WCDs may communicate with the RAN. In turn, the RAN may provide connectivity with other served WCDs and/or with entities on a transport network.

The RAN's frequency channels may each carry communications between the RAN and the WCDs according to an agreed air-interface protocol, examples of which include CDMA (e.g., 1×RTT or 1×EV-DO), LTE, WiMAX (e.g., IEEE 802.16), GSM, WIFI (e.g., IEEE 802.11), Bluetooth, and other protocols now known or later developed. Generally, the agreed air-interface protocol may divide a frequency channel into a "forward link" for carrying communications from the RAN to the WCDs and a "reverse link" for carrying communications from the WCDs to the RAN. And the agreed air-interface protocol may further divide the frequency channel's forward and reverse link into a plurality of sub-channels (also themselves referred to as channels), such as shared control channels for carrying control data (e.g., pilot signal, registration messages, call-setup messages, system parameter messages, etc.) and dedicated traffic channels for carrying bearer-traffic data.

In a typical arrangement, a RAN may provide, in each coverage area, one or more reverse-link control channels—known as an access channels—that are generally available for use by WCDs to send "access probes" (e.g., registration messages, call-setup messages, etc.) to the RAN. Correspondingly, the RAN may periodically broadcast, over at least one forward-link control channel of the coverage area, messages that identify the coverage area's available access channel(s). For example, the RAN may periodically broadcast "channel list messages" (CLMs) that identify each available frequency channel in the given coverage area. In addition, the RAN may also periodically broadcast "access parameters messages" (APMs) that identify each available access channel on each available frequency channel in the coverage area. The RAN may broadcast other such messages as well.

Within such an arrangement, when a WCD wishes to register with the RAN in a coverage area, the WCD may first identify the one or more access channels that are generally available for use by WCDs to access the RAN in the coverage area (e.g., based on the CLMs and/or APMs). In turn, the WCD may then carry out an access-channel selection process to select an available access channel in the coverage area for use to transmit a registration attempt (which may take the form of one or more messages indicating that the WCD wishes to receive service from the RAN in the coverage area). Depending on the coverage area's configuration and/or the air-interface protocol employed, this selection process may take various forms.

For instance, if the WCD identifies only a single access channel in the given coverage area, the WCD may simply select that single access channel to use for transmission of a registration attempt. On the other hand, if the WCD identifies multiple access channels in the coverage area the WCD may execute one or more "hashing algorithms" keyed on one of the WCD's identifiers (e.g., a serial number, directory number, etc.) to select which of the coverage area's access channels to use for transmission of its registration attempt. The WCD may select an access channel in other manners as well.

After making its selection, the WCD may then send its registration attempt to the RAN over the selected access channel in the coverage area. Thereafter, the WCD may operate in an "idle" mode in the coverage area during which the WCD maintains its selection of (and thus continue to operate on) the selected access channel for use to transmit access probes to the RAN until the WCD moves to a new coverage area, detects a change in the coverage area's available access channel(s), etc. Further, if any of the WCD's access probes ultimately result in a new communication session with the RAN in the coverage area, the WCD may transition into an "active" mode and begin engaging in traffic-channel communication with the RAN.

Overview

While the above procedure generally works well to facilitate access to the RAN, there may be times when WCDs in a given coverage area are unable to access the RAN. For instance, as a coverage area becomes more congested and the number of WCDs attempting to access the RAN in the coverage area increases, the occupancy (e.g., the amount of data being carried) on the coverage area's one or more access channels may correspondingly increase. As with any other air-interface channel, however, an access channel is a limited resource that is only capable of carrying a certain amount of data at any given time. As a result, the occupancy on the coverage area's one or more access channels may ultimately reach a point where the RAN is unable to successfully receive access probes from the WCDs—and thus the RAN and the WCDs are unable to engage in registration and/or call-setup signaling—in the coverage area. For example, when the coverage area's access-channel occupancy increases to an undesirable level, collisions may begin to occur between the WCDs' access probes that preclude such access probes from reaching the RAN and/or the RAN may begin blocking access probes in the coverage area until the access-channel occupancy falls back to an acceptable level.

This inability of the RAN to successfully receive access probes from the WCDs in a congested coverage area may lead to several undesirable consequences, including increased call-setup times and failed call attempts. Further, while these consequences may negatively impact the user experience of any subscriber, they are of particular concern for emergency responders and other such subscribers that may require the ability to initiate a time-sensitive communication (e.g., an emergency call) in any coverage area at any moment in time. Accordingly, there is a need to provide certain subscribers with the ability to access the RAN in a coverage area even during times when that coverage area becomes congested to a point where such subscribers may otherwise have difficulties accessing the RAN.

Disclosed herein are methods that help address this need. In accordance with the disclosed methods, a RAN may initially provide, in a coverage area, at least two access channels that are generally available for use by WCDs. Thereafter, a RAN may detect that a threshold load exists in a coverage area and responsively reserve one of the coverage area's access channels for use only by WCDs that are authorized to use reserved access channels. In turn, authorized WCDs in the coverage area may be configured to use the reserved access channel to transmit access probes to the RAN, while unauthorized WCDs in the coverage area may be configured to use only a generally-available access channel to transmit access probes to the RAN. In this way, the disclosed method may limit the occupancy on the reserved access channel and thereby increase the likelihood that authorized WCDs can successfully access the RAN over that reserved access channel when the coverage area becomes congested.

One embodiment of the disclosed methods takes the form of a first method that includes (a) a RAN providing, in a coverage area, two or more access channels that are available for use by any WCD, (b) the RAN detecting that a threshold load exists in the coverage area, (c) in response to detecting that the threshold load exists, the RAN reserving one of the two or more access channels for use only by authorized WCDs, and (d) after reserving one of the two or more access channels, the RAN receiving an access probe from an authorized WCD over the reserved one of the two or more access channels.

The two or more access channels provided by the RAN in the coverage area may take various forms. In one implementation, for instance, the two or more access channels may include one respective access channel on each of two or more frequency channel. In another implementation, the two or more access channels may include two or more access channels on one frequency channel. Other examples are possible as well.

Further, the feature of the RAN detecting that a threshold load exists in the coverage area may take various forms. In one implementation, for instance, this feature may include the RAN comparing a load parameter for the coverage area to a load threshold and thereby determining that the load parameter is greater than the load threshold. And in this implementation, the load parameter and load threshold may be defined based on various factors, examples of which include access-channel utilization, traffic-channel utilization, power utilization and interference. Other examples are possible as well.

The first method may include various additional features as well. As one example, while the RAN is providing the two or more access channels that are available for use by any WCD, the first method may include the RAN publishing one or more available-access-channel notifications that identify each of the two or more access channels as an access channel that is available for use by any WCD. The one or more available-access-channel notifications may take various forms, such as a channel list message identifying frequency channels that are available in the coverage area for use by any WCD and/or an access parameter message identifying access channels that are available in the coverage area for use by any WCD. In accordance with this example, the feature of the RAN reserving one of the two or more access channels may then include the RAN publishing (1) one or more updated available-access-channel notifications that no longer identify the reserved one of the two or more access channels as an access channel that is available for use by any WCD and/or (2) one or more reserved-access-channel notifications that identify the reserved one or the two or more access channels as an access channel that is reserved for use only by authorized WCDs. This feature may take other forms as well.

As another example, after the RAN receives the access probe from the authorized WCD, the first method may additionally include the RAN confirming that the authorized WCD is authorized to use the reserved one of the two or more access channels and then responding to the access probe received from the authorized WCD.

As yet another example, the first method may additionally include the RAN receiving an access probe from an unauthorized WCD over the reserved one of the two or more access channels, failing to confirm that the unauthorized WCD is authorized to use the reserved one of the two or more access channels, and then disregarding the access probe received from the unauthorized WCD.

As still another example, the first method may additionally include the RAN detecting that the threshold load no longer exists in the coverage area and responsively releasing the reserved one of the two or more access channels such that it is available for use by any WCD.

As a further example, before receiving the access probe from the authorized WCD, the first method may additionally include the RAN provisioning the authorized WCD with logic that enables the authorized WCD to use reserved access channels in the RAN.

Another embodiment of the disclosed methods takes the form of a second method that includes (a) a WCD identifying, in a coverage area, two or more access channels that are available for use by any WCD to access a RAN, (b) the WCD carrying out a first access-channel selection process to select one of the identified two or more access channels for use to transmit access probes to the RAN, (c) the WCD discovering that the RAN has reserved one of the identified two or more access channels for use only by authorized WCDs due to the existence of a threshold load in the coverage area, (d) based on the discovery that the RAN has reserved one of the identified two or more access channels, the WCD carrying out a second access-channel selection process to select the reserved one of the identified two or more access channels for use to transmit access probes to the RAN, and (e) the WCD sending an access probe to the RAN over the reserved one of the identified two or more access channels.

The second method may include various additional features as well. As one example, before identifying the two or more access channels that are available for use by any WCD, the second method may additionally include the WCD receiving, from the RAN, at least one available-access-channel notification that identifies each of the two or more access channels as an access channel that is available for use by any WCD.

In accordance with this example, the feature of the WCD identifying the two or more access channels that are available for use by any WCD may then include the WCD identifying the two or more access channels based on the at least one received available-access-channel notification. Further, the feature of the WCD discovering that the RAN has reserved one of the identified two or more access channels may include the WCD receiving (1) an updated available-access-channel notification that does not identify the reserved one of the two or more access channels as an access channel that is available for use by any WCD and/or (2) a reserved-access-channel notification that identifies the reserved one or the two or more access channels as an access channel that is reserved for use only by authorized WCDs. These features may also take other forms.

Also disclosed herein are devices that are configured to carry out the features described herein. One embodiment of the disclosed devices, for instance, may take the form of a RAN entity that includes (a) a communication interface configured to facilitate wireless communication with WCDs in a coverage area and (b) a processing unit configured to carry out RAN-side features of the disclosed methods. Another embodiment of the disclosed devices may take the form of a WCD that includes (a) a communication interface configured to facilitate wireless communication with a RAN and (b) a processing unit configured to carry out WCD-side features of the disclosed methods.

These as well as other aspects and advantages will become apparent to those of ordinary skill in the art by reading the following detailed description, with reference where appropriate to the accompanying drawings.

DETAILED DESCRIPTION

I. Example Communications System

As noted above, FIG. 1 is a simplified block diagram of an example communication system 10 in which embodiments of the disclosed methods and corresponding devices can be implemented. As shown, system 10 may include a RAN 12 that functions to provide connectivity between one or more WCDs, such as WCDs 14a-b, and one or more transport networks, such as circuit-switched network 16 and/or packet-switched network 18.

It should be understood that the arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions written in any suitable programming language (e.g., C, C++, Java, etc.) and stored in memory.

Figure 1:
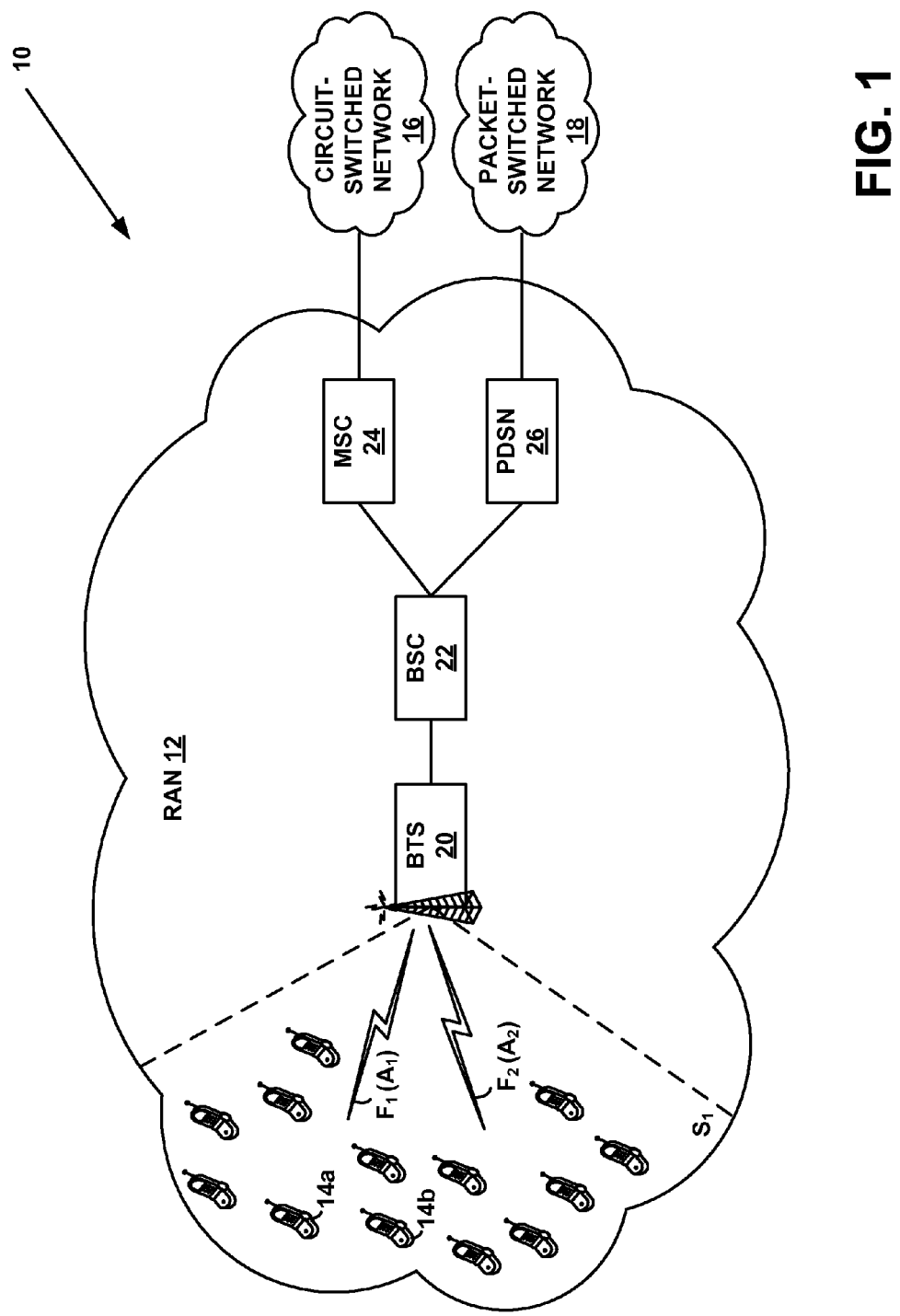
FIG. 1 is a simplified block diagram of an example communication system in which in which embodiments of the disclosed methods and corresponding devices can be implemented.

As shown in FIG. 1, RAN 12 may include one or more base transceiver stations (BTSs), such as BTS 20. (Although FIG. 1 depicts RAN 12 as including one BTS, it should be understood that a RAN may include more than one BTS.) BTS 20 may be any entity that facilitates air-interface communication between RAN 12 and one or more WCDs, such as WCDs 14a-b. For instance, BTS 20 may radiate to define one or more wireless coverage areas, such as a cell and/or sectors. Within each such coverage area, BTS 20 may then provide one or more frequency channels over which WCDs may communicate with BTS 20. In turn, BTS 20 may control aspects of air-interface communication over its one or more frequency channels, including aspects of call setup, handoff, power control, etc. BTS 20 may perform other functions as well.

The frequency channels provided by the RAN's one or more BTSs may take various forms. According to one arrangement, for instance, the frequency channels may each be defined as a specific frequency block (e.g., a 1.25 MHz or 5 MHz block) in a profile frequency band used by the wireless service provider, such as 800 MHz (cellular band), 1.9 GHz (PCS band), or 2.5 GHz (BRS/EBS band). Moreover, the frequency channels may carry communications between RAN 12 and WCDs according to an agreed air-interface protocol (such as those noted above) that divides each frequency channel into forward-link channels for carrying communications from RAN 12 to WCDs and reverse-link channels for carrying communications from WCDs to RAN 12.

For example, according to a CDMA 1xEV-DO protocol, each frequency channel may have a forward link that is time-division multiplexed into timeslots with a length of 2048 chips and duration of approximately 1.67 milliseconds (ms). In turn, each such forward-link timeslot may be further time-division multiplexed into various forward sub-channels for carrying communications from RAN 12 to WCDs. For instance, each forward-link timeslot may be divided into two 1024-chip half-slots, which are then each arranged to carry a 96-chip forward pilot channel, two 64-chip forward medium access control (MAC) channel segments, and two 400-chip forward data segments allocated for either a forward control channel or a forward traffic channel. Further, according to a CDMA 1xEV-DO protocol, each frequency channel may have a reverse link that is code-division multiplexed via Walsh codes into various reverse channels for carrying communications from WCDs to RAN 12, including one reverse access channel, one reverse pilot channel, and one or more reverse traffic channels.

As another example, according to a CDMA 1xRTT protocol, each frequency channel may have a forward link that is code-division multiplexed via Walsh codes into various forward channels for carrying communications from RAN 12 to WCDs, including a forward pilot channel, a forward sync channel, one or more forward paging channels, one or more other forward control channels, and one or more forward traffic channels. Similarly, according to a CDMA 1xRTT protocol, each frequency channel may have a reverse link that is code-division multiplexed via Walsh codes into various reverse channels for carrying communications from WCDs to RAN 12, such as one or more reverse access channels, one or more reverse pilot channels, and one or more reverse traffic channels.

Regardless of the agreed air-interface protocol employed, each frequency channel's reverse link will typically include at least one reverse access channel over which WCDs can send "access probes," such as registration messages, call-setup messages, etc. As a result, in each coverage area, RAN 12 will typically provide at least one such access channel. And in certain coverage areas, RAN 12 may provide multiple such access channels. For example, RAN 12 may provide, in a given coverage area, one respective access channel on each of multiple frequency channels. Such a configuration is illustrated in FIG. 1, which depicts BTS 20 as providing, in a first sector $S_1$, a first access channel $A_1$ on a first frequency channel $F_1$ and a second access channel $A_2$ on a second frequency channel $F_2$. As another example, RAN 12 may provide multiple access channels on a single frequency channel in a given coverage area. Other configurations are possible as well.

As additionally shown in FIG. 1, RAN 12 may also include at least one base station controller (BSC), such as BSC 22, to which BTS 20 couples. (Although FIG. 1 depicts RAN 12 as including one BSC, it should be understood that RAN 12 may include more than one BSC, in which case each BSC may couple to a subset of the BTSs in RAN 12. Further, although BSC 22 is depicted as separate entity from BTS 20, it should be understood that BSC 22 may be integrated together in whole or in part with BTS 20. Further yet, BTS 20 and BSC 22 may together be referred to as a "base station.") BSC 22 may control aspects of BTS 20 as well as aspects of wireless communication with WCDs, such as aspects of call setup, handoff, and/or power control for instance. BSC 22 may perform other functions as well.

Further, RAN 12 may include at least one mobile switching center (MSC), such as MSC 24, to which BSC 22 couples. (Although FIG. 1 depicts RAN 12 as including one MSC, it should be understood that RAN 12 may include more than one MSC, in which case each MSC may couple to a subset of the BSCs in RAN 12.) As shown, MSC 24 may provide connectivity with circuit-switched network 16. Further, MSC 24 may control aspects of BTS 20 and/or BSC 22 as well as aspects of wireless communication with WCDs, such as aspects of call setup, handoff, and/or power control for instance. MSC 24 may perform other functions as well.

Further yet, RAN 12 may include at least one packet data serving node (PDSN), such as PDSN 26, to which BSC 22 couples. (Although FIG. 1 depicts RAN 12 as including one PDSN, it should be understood that RAN 12 may include more than one PDSN, in which case each PDSN may couple to a subset of the BSCs in RAN 12.) As shown, PDSN 26 may provide connectivity with packet-switched network 16. PSDN 26 may perform other functions as well.

Although not shown, RAN 12 may also include and/or have access to various other entities. For example, RAN 12 may include or have access to a home location register (HLR), a visitor location register (VLR), or the like that functions to maintain profile data for subscribers and/or WCDs in RAN 12, such as account information, preferences, and/or a last-known location for instance. As another example, RAN 12 may include a provisioning server or the like that functions to provision WCDs with new and/or updated program logic and associated data. Other examples are possible as well.

WCDs 14*a-b* may each be any device configured to receive wireless service from RAN 12. By way of example only, WCDs 14*a-b* may each take the form of a cellular telephone, a computer (e.g., a desktop, laptop, tablet, netbook, etc.), a personal digital assistant (PDA), or a personal navigation device (PND). Other examples are possible as well.

II. Disclosed Methods

As noted above, disclosed herein are methods that help address a need to provide certain subscribers with the ability to access RAN 12 in a coverage area even during times when that coverage area becomes congested to a point where such subscribers may otherwise have difficulties obtaining such access. According to the disclosed methods, a RAN may initially provide, in a coverage area, at least two access channels that are generally available for use by WCDs. Thereafter, the RAN may detect that a threshold load exists in a coverage area and responsively reserve one of the coverage area's access channels for use only by WCDs that are authorized to use reserved access channels, such as those registered to specific classes of subscribers (e.g., emergency responders and the like), subscribers paying additional fees for such authorization, etc. In turn, authorized WCDs in the coverage area may be configured to use the reserved access channel to transmit access probes to the RAN, while unauthorized WCDs in the coverage area may be configured to use only a generally-available access channel to transmit access probes to the RAN. In this way, the disclosed method may limit the occupancy on the reserved access channel and thereby increase the likelihood that authorized WCDs can successfully access the RAN when the coverage area becomes congested.

Figure 2:
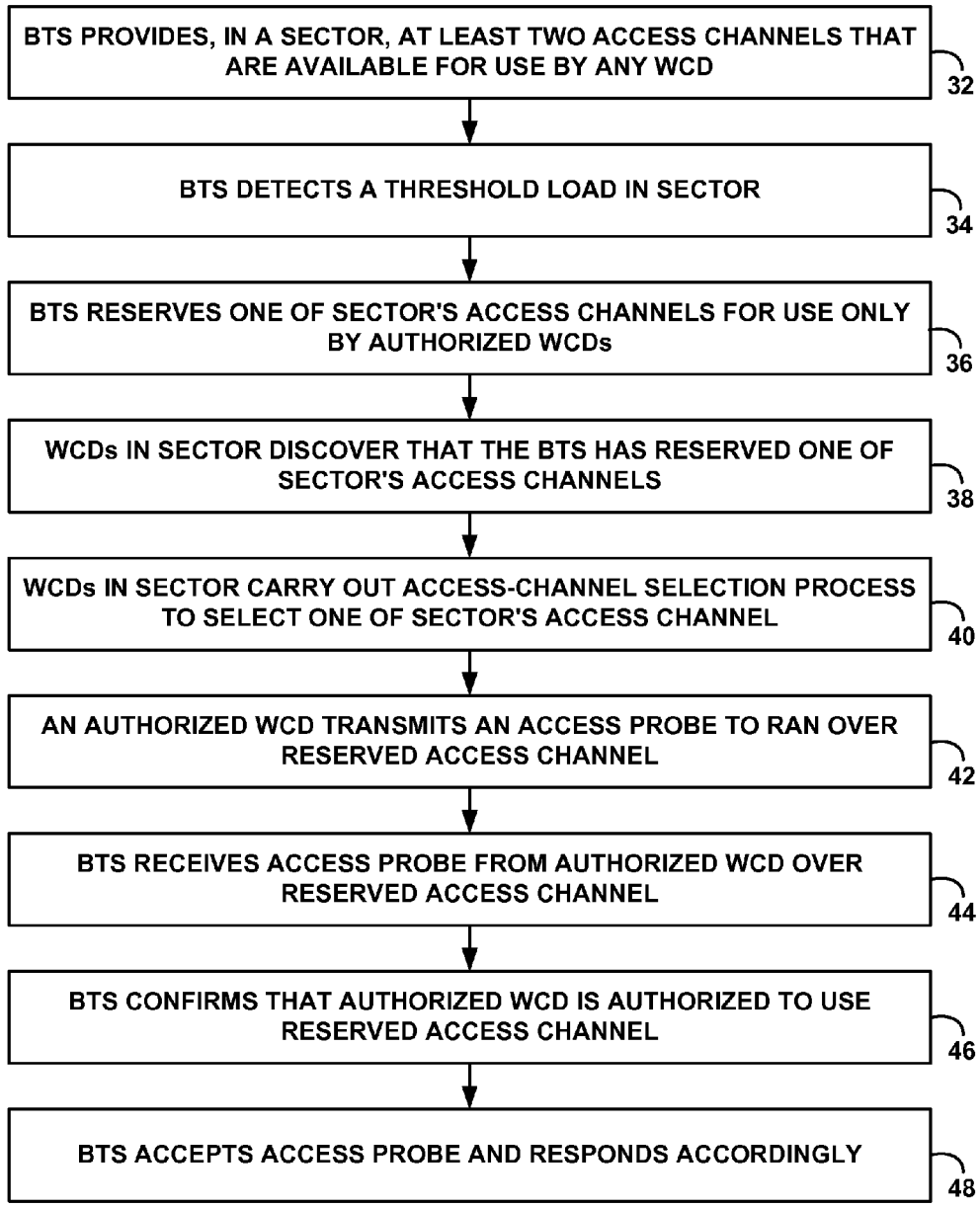
FIG. 2 is a flow chart depicting functions that can be carried out in accordance with an example embodiment of the disclosed methods.

FIG. 2 is a flow chart depicting functions that can be carried out in accordance with an example embodiment of the disclosed methods. For purposes of illustration, these functions will be described with reference to sector $S_1$, where BTS 20 provides wireless service to WCDs including WCDs 14*a-b*. Further, for purposes of illustration, the following description will assume that WCD 14*a* (but not WCD 14*b*) is authorized to use reserved access channels in RAN 12 and has thus been provisioned with logic and associated data that enables this use (e.g., via over-the-air provisioning by RAN 12, manual provisioning by a sales or service technician, etc.)

As shown in FIG. 2, the embodiment begins at step 32 with BTS 20 providing at least two access channels in sector $S_1$, such as access channel $A_1$ on frequency channel $F_1$ and access channel $A_2$ on frequency channel $F_2$, which are available for use by any WCD in sector $S_1$ (including WCDs 14*a-b*) to access RAN 12. While providing these access channels, BTS 20 may also periodically publish "available-access-channel" notifications identifying the access channels available for use by any WCD in sector $S_1$. These available-access-channel notifications may take various forms, such as "channel list messages" (CLMs) that identify frequency channels $F_1$ and $F_2$ in sector $S_1$ and/or "access parameters messages" (APMs) that identify access channels $A_1$ and $A_2$ on frequency channels $F_1$ and $F_2$ in sector $S_1$.

Correspondingly, WCDs in sector $S_1$ (including WCDs 14*a-b*) may identify the at least two access channels that are available for use by any WCD in sector $S_1$ (e.g., based on an available-access-channel notification) and then carry out an access-channel selection process to select one of the identified access channels for use to transmit access probes to RAN 12 in sector $S_1$. This access-channel selection process may be carried out at various times, such as when a WCD enters sector $S_1$ and/or when a WCD transitions from an active mode back to an idle mode.

This access-channel selection process may also take various forms. In one implementation, for instance, a WCD in sector $S_1$ may execute one or more "hashing algorithms" keyed on one of the WCD's identifiers (e.g., a serial number, directory number, etc.) to select one of the sector's access channels for use to transmit access probes to RAN 12. For example, a WCD may execute a first hashing algorithm that produces an index value pointing to a particular place in a CLM for sector $S_1$ and thereby identifying which of frequency channels $F_1$ and $F_2$ to select. Given that each of frequency channels $F_1$ and $F_2$ in sector $S_1$ has only a single access channel, the WCD may then simply select the identified frequency channel's access channel. If a frequency channel in sector $S_1$ had multiple access channels, however, the WCD may then execute a second hashing algorithm that produces an index value pointing to a particular place in an APM for the identified frequency channel and thereby identifying which access channel to select. The access-channel selection process may take other forms as well. For purposes of illustration only, the following description will assume that WCD 14*a* has selected (and is thus operating on) access channel $A_1$ on frequency channel $F_1$ and that WCD 14*b* has selected (and is thus operating on) access channel $A_2$ on frequency channel $F_2$.

At step 34, BTS 20 may then detect that a threshold load exists in sector $S_1$ using any technique now known or later developed. In one implementation, for instance, BTS 20 may detect that the threshold load exists in sector $S_1$ by comparing a load parameter for sector $S_1$ to a configurable load threshold and thereby determining that the load parameter is greater than the load threshold. In this respect, the load threshold will preferably be configured (e.g., by a service provider, a network operator, and/or RAN 12 itself) to reflect a level of loading in sector $S_1$ that will trigger BTS 20 to reserve an access channel in sector $S_1$ for use only by authorized WCDs.

The load parameter and load threshold may be defined based on any metric now known or later developed that reflects loading in a coverage area, and in a preferred embodiment, will be defined based on a combination of two or more such metrics. As one example, the load parameter may be defined based on a current utilization of access channels in sector $S_1$ (e.g., a percentage of total available access-channel capacity occupied on one or both of access channels $A_1$ and $A_2$) and the load threshold may be defined based on a threshold access-channel utilization. As another example, the load parameter may be defined based on a current utilization of traffic channels in sector $S_1$ (e.g., a percentage of total available forward and/or reverse traffic channels assigned to WCDs on one or both of frequency channels $F_1$ and $F_2$) and the load threshold may be defined based on a threshold traffic-channel utilization. As yet another example, the load parameter may be defined based on a current power utilization in sector $S_1$ (e.g., a percentage of total available power consumed on one or both of frequency channels $F_1$ and $F_2$) and the load threshold may be defined based on a threshold power utilization. As a further example, the load parameter may be defined based on a current level of interference in sector $S_1$ (e.g., a reverse noise rise on one or both of frequency channels $F_1$ and $F_2$) and the load threshold may be defined based on a threshold interference level. The load parameter and load threshold may be defined based on other metrics as well.

At step 36, in response to detecting that the threshold load exists in sector $S_1$, BTS 20 may reserve one of the access channels in sector $S_1$ for use only by authorized WCDs. BTS 20 may carry out this access-channel reservation in various manners.

In one implementation, for instance, BTS 20 may first select which access channel in sector $S_1$ to reserve for use only by authorized WCDs. This selection may be based on various factors, examples of which include identifying information for the access channels (e.g., pseudonoise offset ("PN offsets"), carrier frequencies, Walsh codes, etc.), a load parameter for sector $S_1$, etc. In a preferred implementation, BTS 20 will select the least-utilized access channel in sector $S_1$ (e.g., the access channel having the lowest access-channel utilization and/or the access channel on the frequency channel having the lowest traffic-channel utilization, the lowest power utilization, and/or the lowest level of interference) to reserve for use only by authorized WCDs. In alternative implementations, however, BTS 20 may select some other access channel to reserve for use only by authorized WCDs. For purposes of illustration only, the following description will assume that BTS 20 selects access channel $A_2$ on frequency channel $F_2$ to reserve for use only by authorized WCDs.

After selecting the access channel in sector $S_1$ to reserve, BTS 20 may then begin publishing updated available-access-channel notifications (e.g., CLMs and/or APMs) that do not identify the selected access channel as an access channel available for use by any WCD in sector $S_1$. In addition, BTS 20 may begin publishing "reserved-access-channel" notifications that identify the selected access channel as an access channel reserved for use only by authorized WCDs in sector $S_1$. These reserved-access-channel notifications may take various forms, such as an existing broadcast message (e.g., an extended CLM) that is modified to identify a reserved access channel and/or a new broadcast message that is specifically arranged to identify a reserved access channel.

BTS 20 may also update any stored data identifying the access channels in sector $S_1$ to indicate that the selected access channel is no longer available for use by any WCD in sector $S_1$ and/or is reserved for use only by authorized WCDs in sector $S_1$. And BTS 20 may take other actions in connection with the access-channel reservation as well.

At step 38, WCDs in sector $S_1$ (including WCDs 14*a-b*) may discover that BTS 20 has reserved one of the identified access channels in sector $S_1$ for use only by authorized WCDs. For example, WCDs in sector $S_1$ may receive an updated available-access-channel notification for sector $S_1$ and thereby detect that the reserved access channel is no longer being identified as an access channel available for use by any WCD in sector $S_1$, which may serve as an indication that the reserved access channel has been reserved for use only by authorized WCDs in sector $S_1$. As another example, WCDs in sector $S_1$ may receive a reserved-access-channel notification identifying the reserved access channel as an access channel reserved for use only by authorized WCDs in sector $S_1$. WCDs in sector $S_1$ may discover that BTS 20 has reserved one of the access channels in sector $S_1$ for use only by authorized WCDs in other manners as well.

At step 40, based on the discovery that BTS 20 has reserved one of the access channels in sector $S_1$, WCDs in sector $S_1$ (including WCDs 14*a-b*) may carry out another access-channel selection process to select one of the sector's access channels for use to transmit access probes to RAN 12 in sector $S_1$. In one implementation, a WCD may carry out this access-channel selection process in response to the WCD's discovery that BTS 20 has reserved one of the access channels in sector $S_1$. In another implementation, a WCD may carry out this access-channel selection process in response to an event that occurs after the WCD's discovery that BTS 20 has reserved one of the access channels in sector $S_1$, such as a user instruction to initiate a communication with RAN 12 in sector $S_1$ (e.g., either any communication or a time-sensitive communication only such as an emergency call), a failure to initiate a communication with RAN 12 over an available access channel in sector $S_1$, etc.

Depending on whether or not a WCD is authorized to use reserved channels in RAN 12, this access-channel selection process may also take various forms. For instance, based on the discovery that BTS 20 has reserved one of the access channels in sector $S_1$, authorized WCDs in sector $S_1$ may each simply select the reserved access channel (e.g., access channel $A_2$) for use to transmit of access probes to RAN 12. In accordance with this selection, authorized WCDs that were previously operating on an access channel that is still available for use by any WCDs in sector $S_1$ may then transition to operating on the access channel that is now reserved for use only by authorized WCDs in sector $S_1$ (e.g., WCD 14*a* may transition from operating on access channel $A_1$ to operating on access channel $A_2$). And authorized WCDs in sector $S_1$ that were previously operating on the access channel that is now reserved for use only by authorized WCDs in sector $S_1$ may simply continue operating on that access channel.

On the other hand, based on the discovery that BTS 20 has reserved one of the access channels in sector $S_1$, unauthorized WCDs in sector $S_1$ may each select an access channel that is still available for use by any WCDs in sector $S_1$ (e.g., access channel $A_1$) using any technique now known or later developed, including the techniques described above. In accordance with this selection, unauthorized WCDs that were previously operating on an access channel that is now reserved for use only by authorized WCDs in sector $S_1$ may transition to operating on an access channel that is still available for use by any WCDs in sector $S_1$ (e.g., WCD 14b may transition from operating on access channel $A_2$ to operating on access channel $A_1$). And unauthorized WCDs in sector $S_1$ that were previously operating on an access channel that is still available for use by any WCDs in sector $S_1$ may continue operating on that access channel.

At step 42, an authorized WCD in sector $S_1$, such as WCD 14a, may transmit an access probe to RAN 12 over the reserved access channel in sector $S_1$. This access probe may include various information relating to WCD 14a, such as identifying information for WCD 14a and perhaps an indication of whether WCD 14a is authorized, as well as other information related to the nature of the access probe. Further, the WCD's transmission of this access probe may be triggered by various events. In one implementation, for instance, WCD 14a may transmit the access probe in response to an event that occurs after WCD 14a has selected the reserved access channel in sector $S_1$ for use to transmit access probes, such as a decision by WCD 14 to register with RAN 12 in sector $S_1$, a user instruction to initiate a communication with RAN 12 in sector $S_1$, etc. In another implementation, however, WCD 14a may transmit the access probe in response to the same event that triggers WCD 14a to select the reserved access channel in sector $S_1$ for use to transmit access probes to RAN 12, such as a user instruction to initiate a communication with RAN 12 in sector $S_1$ (e.g., either any communication or only a time-sensitive communication such as an emergency call), a failure to initiate a communication with RAN 12 over an available access channel in sector $S_1$, etc.

At step 44, BTS 20 may then receive the access probe from WCD 14a over the reserved access channel in sector $S_1$. In turn, at step 46, BTS 20 may confirm that WCD 14a is authorized to use the reserved access channel in sector $S_1$ using any technique now known or later developed. In one implementation, for instance, BTS 20 may use identifying information for WCD 14a to perform a lookup in stored data identifying authorized WCDs and thereby confirm that WCD 14a is authorized to use the reserved access channel in sector $S_1$. In another implementation, if the access probe includes an indication of whether WCD 14a is authorized, BTS 20 may use this indication to confirm that WCD 14a is authorized to use the reserved access channel in sector $S_1$. And in yet another implementation, BTS 20 may presume that only authorized WCDs will use reserved access channels in RAN 12 and thus consider its receipt of the access probe from WCD 14a over the reserved access channel in sector $S_1$ as confirmation that WCD 14a is authorized to use the reserved access channel in sector $S_1$.

At step 46, after confirming that WCD 14a is authorized to use the reserved access channel in sector $S_1$, BTS 20 may then accept the access probe and respond accordingly. For example, if the WCD's access probe is a registration attempt, BTS 20 may respond by engaging in registration signaling with WCD 14a in sector $S_1$ and/or registering WCD 14a for service in sector $S_1$. As another example, if the WCD's access probe is a call origination message, BTS 20 may respond by engaging in call-setup signaling with WCD 14a in sector $S_1$ and/or assigning traffic channels to WCD 14a in sector $S_1$. Other examples are possible as well.

Although not shown in FIG. 2, it is also possible that an unauthorized WCD, such as WCD 14b, may improperly use the reserved access channel in sector $S_1$ to transmit an access probe to RAN 12. For example, WCD 14b could transmit an access probe over the reserved access channel in sector $S_1$ before discovering that BTS 20 has reserved such access channel for use only by authorized WCDs. As another example, WCD 14b could transmit an access probe over the reserved access channel in sector $S_1$ as a result of corrupt or outdated logic and/or reference data. Other examples are possible as well.

As a result of WCD 14b transmitting an access probe over the reserved access channel in sector $S_1$, BTS 20 may then receive the access probe from WCD 14b. In turn, BTS 20 may fail to confirm that WCD 14b is authorized to use the reserved access channel in sector $S_1$ using any technique now known or later developed, including some of the techniques described above. And after failing to confirm that WCD 14b is authorized to use the reserved access channel in sector $S_1$, BTS 20 may then disregard the access probe.

At some point after reserving the access channel in sector $S_1$ for use only by authorized WCDs, BTS 20 may also detect that the threshold load no longer exists in sector $S_1$ using any technique now known or later developed. In one implementation, for instance, BTS 20 may detect that the threshold load no longer exists in sector $S_1$ by comparing a load parameter for sector $S_1$ to a configurable load threshold and thereby determining that the load parameter is below the load threshold. In this respect, the load parameter and load threshold may take various forms, including any of the forms described above.

In response to detecting that the threshold load no longer exists in sector $S_1$, BTS 20 may release the reserved access channel in sector $S_1$ (e.g., access channel $A_2$) such that it is available for use by any WCD in sector $S_1$. BTS 20 may carry out this access-channel release in various manners. In one implementation, for instance, BTS 20 may begin publishing updated available-access-channel notifications (e.g., CLMs and/or APMs) that identify the previously-reserved access channel as an access channel available for use by any WCD in sector $S_1$. In addition, BTS 20 may stop publishing reserved-access-channel notifications that identify the previously-reserved access channel as an access channel reserved for use only by authorized WCDs in sector $S_1$. And BTS 20 may also update any stored data identifying the access channels in sector $S_1$ to indicate that the previously-reserved access channel is now available for use by any WCD in sector $S_1$. BTS 20 may take other actions in connection with the access-channel release as well.

III. Example BTS

Figure 3:
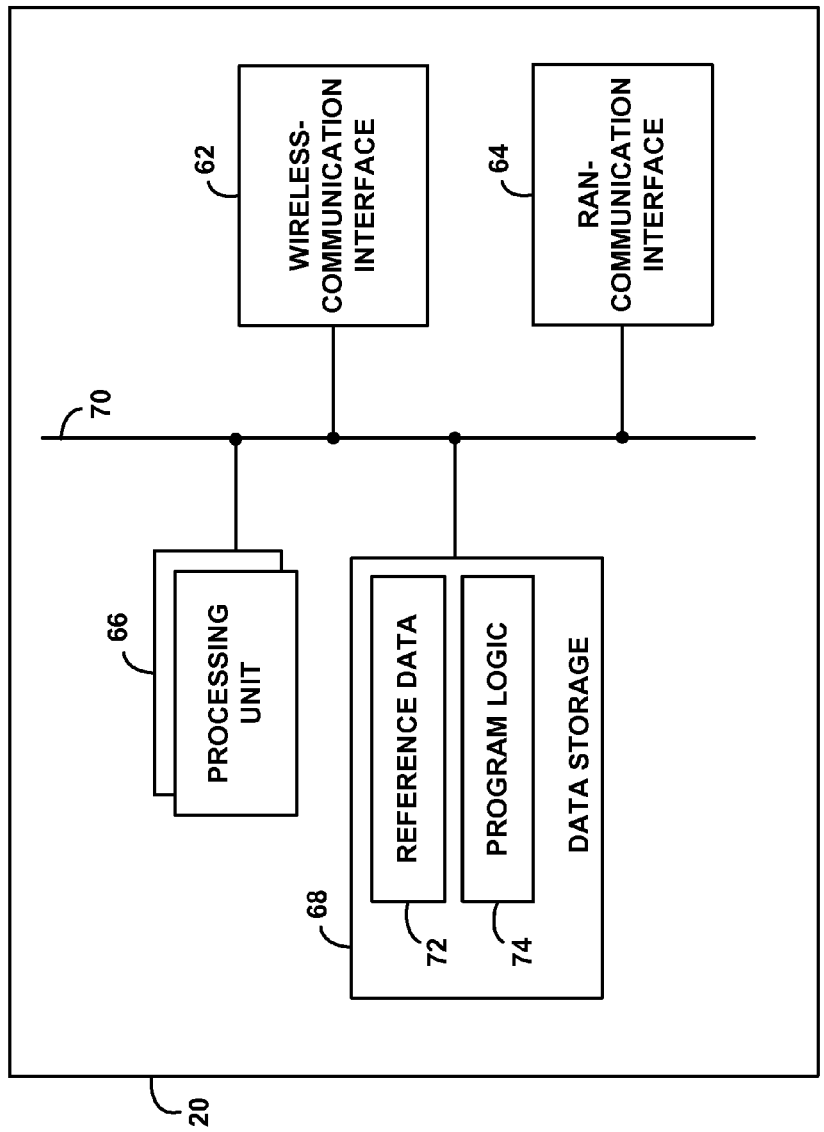
FIG. 3 is a simplified block diagram showing functional components that an example radio access network entity may include to facilitate implementation of embodiments of the disclosed methods.

FIG. 3 is a simplified block diagram showing functional components that may be included in an example RAN entity, such as BTS 20, to facilitate implementation of the disclosed methods. (It should be understood that some or all of these functional components may also be distributed across multiple RAN entities, such as BTS 20 and BSC 22). As shown in FIG. 3, example BTS 20 may include a wireless-communication interface 62, a RAN-communication interface 64, a processing unit 66, and data storage 68, all linked together via a system bus, network, or other connection mechanism 70. BTS 20 may include other components as well.

Referring to FIG. 3, wireless-communication interface 62 may radiate to provide one or more frequency channels in each of one or more wireless coverage areas, such as frequency channels $F_1$ and $F_2$ in sector $S_1$, over which WCDs may communicate with BTS 20. As such, wireless-communication interface 62 may include one or more antenna structures arranged in various ways (e.g., one or more directional or sectored antennas). Additionally, wireless-communication interface 62 may include a power amplifier for each provided frequency channel. Other configurations are possible as well.

RAN-communication interface 64 may function to communicatively couple BTS 20 to other RAN entities, such as BSC 22, MSC 24, PSDN 26, etc. As such, RAN-communication interface 64 may take the form of an Ethernet interface, a serial bus interface (e.g., Firewire, USB 2.0, etc.), a chipset and antenna adapted to facilitate wireless communication according a desired protocol, and/or any other interface that provides for wired and/or wireless communication with RAN entities. RAN-communication interface 64 may also include multiple interfaces, such as an Ethernet interface and a serial bus interface. Other configurations are possible as well.

Processing unit 66 may comprise one or more processor components, such as general-purpose processors (e.g., a microprocessor), application-specific processors (e.g., an application-specific integrated circuit (ASIC) or digital signal processor (DSP)), programmable logic devices (e.g., a field programmable gate array (FPGA)), and/or other processor components now known or later developed, some of which may be integrated in whole or in part with other components of BTS 20.

Data storage 68 may then comprise one or more non-transitory computer-readable storage mediums, such as volatile data storage mediums (e.g., random access memory (RAM), registers, and/or cache) and/or non-volatile data storage mediums (e.g., read only memory (ROM), a hard-disk drive, a solid-state drive, flash memory, and/or an optical storage device), some of which may be integrated in whole or in part with other components of BTS 20. And as shown, in one example, data storage 68 may contain reference data 72 and program logic 74. (It should be understood, however, that some or all of program logic 74 could be directly encoded onto other components of BTS 20.)

Reference data 72 may contain identifying information relating to the one or more coverage areas defined by BTS 20, such as an identifier of each such coverage area (e.g., a PN offset), an identifier of each frequency channel in each such coverage area (e.g., a carrier frequency), identifiers of the forward and/or reverse channels on each such frequency channel (e.g., MAC IDs and/or Walsh codes), etc. Correspondingly, reference data 74 may contain an indication of whether each access channel in each such coverage area is available for use by any WCD or is reserved for use only by authorized WCDs. Reference data 72 may also contain identifying information relating to WCDs in the one or more coverage areas, such as an identifier of each such WCD (e.g., a directory or serial number), identifiers of any frequency channel (e.g., a carrier frequency), control channel (e.g., MAC IDs and/or Walsh codes), and/or traffic channel (e.g., MAC IDs and/or Walsh codes) associated with each such WCD, etc. Reference data 72 may contain various other data as well.

Program logic 74 may then comprise machine-language instructions or the like that may be executed or interpreted by processing unit 66 to carry out various functions described herein. For example, program logic 74 may be executable by processing unit 66 to (a) provide, in a coverage area, at least two access channels that are available for use by any WCD in that coverage area to access RAN 12, (b) detect that a threshold load exists in the coverage area, (c) in response to the detecting, reserve one of the access channels in the coverage area for use only by authorized WCDs, (d) receive an access probe from a WCD over the reserved access channel in the coverage area, (e) determine that the WCD is authorized to use the reserved access channel in the coverage area, and (f) respond to the access probe. Program logic 74 may be executable by processing unit 66 to carry out various other functions as well.

IV. Example WCD

Figure 4:
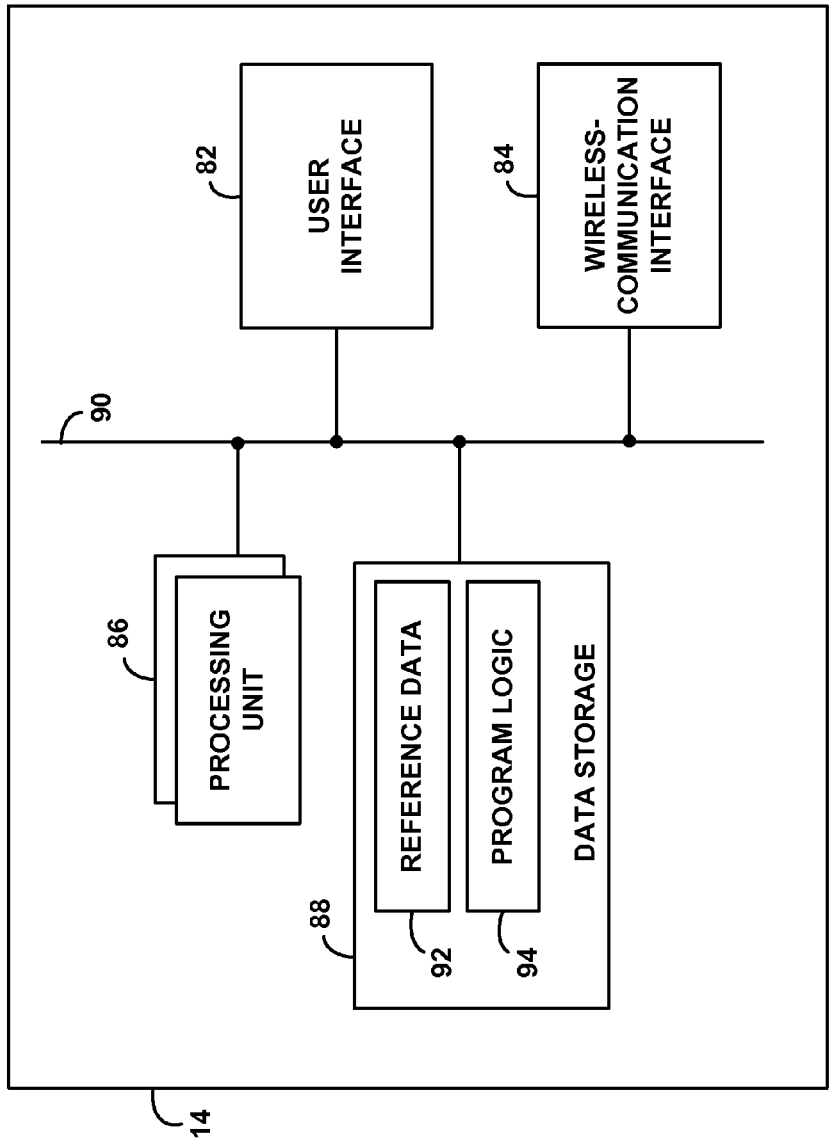
FIG. 4 is a simplified block diagram showing functional components that an example wireless communication device may include to facilitate implementation of embodiments of the disclosed methods.

FIG. 4 is a simplified block diagram showing functional components that may be included in an example WCD, such as WCD 14a, to facilitate implementation of the disclosed methods. As shown in FIG. 4, example WCD 14a may include a user interface 82, a wireless-communication interface 84, a processing unit 86, and data storage 88, all linked together via a system bus, network, and/or other connection mechanism 90. WCD 14a may include other components as well.

Referring to FIG. 4, the user interface 82 may be configured to facilitate user interaction with WCD 14a, and may thus include or provide connectivity to various components that facilitate such user interaction. For instance, user interface 82 may include or provide connectivity to input components, examples of which include a touch-sensitive display, a navigation pad, a special-purpose button (e.g., for initiating a time-sensitive communication), a multi-purpose button, a thumb wheel, a keyboard or keypad, a microphone, etc. Additionally, user interface 82 may include or provide connectivity to output components, examples of which include a display screen, a speaker, a headset jack, etc. Additionally yet, user interface 82 may include signal processing components, examples of which include analog-to-digital (A-D), digital-to-analog (D-A) circuitry, etc. Other configurations are possible as well.

Wireless-communication interface 84 may be configured to facilitate wireless communication with a RAN according to one or more wireless protocols, such as the example protocols mentioned above. As such, wireless-communication interface 84 may include a chipset and one or more antennas that are arranged to communicate according to one or more protocols. Other configurations are possible as well.

Processing unit 86 may comprise one or more processor components, such as general-purpose processors (e.g., a microprocessor), application-specific processors (e.g., an ASIC or DSP), programmable logic devices (e.g., an FPGA), and/or other processor components now known or later developed, some of which may be integrated in whole or in part with other components of WCD 14.

Data storage 88 may then comprise one or more non-transitory computer-readable storage mediums, such as volatile data storage components (e.g., RAM, registers, and/or cache) and/or non-volatile data storage components (e.g., ROM, a hard-disk drive, a solid-state drive, flash memory, an optical storage device, and/or a floppy disk), some of which may be integrated in whole or in part with other components of WCD 14. And as shown, in one example, data storage 88 may contain reference data 92 and program logic 94. (It should be understood, however, that some or all of program logic 94 could be directly encoded onto the other components of WCD 14.)

Reference data 92 may contain identifying information for WCD 14a, such as one or more WCD and/or subscriber identifiers (e.g., a directory and/or serial number), as well as an indication of whether WCD 14a is authorized to use reserved channels in a RAN. Reference data 92 may also contain identifying information relating to a coverage area in which WCD 14a is registered with a RAN, such as an identifier of the coverage area (e.g., a PN offset), identifiers of the frequency channel (e.g., a carrier frequency) and/or control channels (e.g., a Walsh code) on which WCD 14*a* is operating, identifiers of any forward and/or reverse traffic channels assigned to WCD 14*a* (e.g., MAC IDs and/or Walsh codes), etc. Correspondingly, reference data 92 may contain an indication of whether the WCD's selected access channel is available for use by any WCD or reserved for use only by authorized WCDs. Reference data 92 may contain various other data as well.

Program logic 94 may then comprise machine-language instructions or the like that may be executed or interpreted by processing unit 86 to carry out various functions described herein. For example, program logic 94 may be executable by processing unit 86 to (a) identify, in a coverage area, at least two access channels that are available for use by any WCD to access a RAN, (b) carry out a first access-channel selection process to select one of the identified access channels for use to transmit access probes to the RAN, (c) discover that BTS 20 has reserved one of the identified access channels in sector $S_1$ for use only by authorized WCDs, (d) based on the discovery, carry out a second access-channel selection process to select the reserved access channel in the coverage area for use to transmit access probes to the RAN, and (e) transmitting an access probe to the RAN over the reserved access channel in the coverage area. Program logic 94 may be executable by processing unit 86 to carry out various other functions as well.

V. Conclusion

While example embodiments have been described above, those skilled in the art will understand that changes and modifications may be made to these embodiments without departing from the true scope and spirit of the present invention, which is defined by the claims.

We claim:

1. A method comprising:
   a radio access network (RAN) providing, in a coverage area, two or more access channels that are available for use by any wireless communication device (WCD);
   the RAN detecting that a threshold load exists in the coverage area;
   in response to detecting that the threshold load exists, the RAN reserving one of the two or more access channels for use only by authorized WCDs; and
   after reserving one of the two or more access channels, the RAN receiving an access probe from an authorized WCD over the reserved one of the two or more access channels.

2. The method of claim 1, wherein the two or more access channels comprise one respective access channel on each of two or more frequency channels.

3. The method of claim 1, wherein the two or more access channels comprise two or more access channels on one frequency channel.

4. The method of claim 1, wherein the RAN detecting that a threshold load exists in the coverage area comprises the RAN comparing a load parameter for the coverage area to a load threshold and thereby determining that the load parameter is greater than the load threshold.

5. The method of claim 4, wherein the load parameter and the load threshold are defined based on one or more of:
   access-channel utilization;
   traffic-channel utilization;
   power utilization; and
   interference.

6. The method of claim 1, further comprising:
   while providing the two or more access channels that are available for use by any WCD, the RAN publishing one or more available-access-channel notifications that identify each of the two or more access channels as an access channel that is available for use by any WCD.

7. The method of claim 6, wherein each of the one or more available-access-channel notifications comprise one or both of:
   a channel list message identifying frequency channels that are available in the coverage area for use by any WCD; and
   an access parameter message identifying access channels that are available in the coverage area for use by any WCD.

8. The method of claim 6, wherein the RAN reserving one of the two or more access channels for use only by authorized WCD comprises one or both of:
   the RAN publishing one or more updated available-access-channel notifications that no longer identify the reserved one of the two or more access channels as an access channel that is available for use by any WCD; and
   the RAN publishing one or more reserved-access-channel notifications that identify the reserved one or the two or more access channels as an access channel that is reserved for use only by authorized WCDs.

9. The method of claim 1, further comprising:
   after receiving the access probe from the authorized WCD, the RAN confirming that the authorized WCD is authorized to use the reserved one of the two or more access channels and then responding to the access probe received from the authorized WCD.

10. The method of claim 9, wherein the RAN responding to the access probe comprises one or more of:
    engaging in registration signaling with the WCD in the coverage area;
    registering the WCD for service in the coverage area;
    engaging in call-setup signaling with the WCD in the coverage area; and
    assigning traffic channels to the WCD in the coverage area.

11. The method of claim 1, further comprising:
    after reserving one of the two or more access channels, the RAN receiving an access probe from an unauthorized WCD over the reserved one of the two or more access channels; and
    the RAN failing to confirm that the unauthorized WCD is authorized to use the reserved one of the two or more access channels and then disregarding to the access probe received from the unauthorized WCD.

12. The method of claim 1, further comprising:
    the RAN detecting that the threshold load no longer exists in the coverage area; and
    in response to detecting that the threshold load no longer exists, the RAN releasing the reserved one of the two or more access channels such that it is available for use by any WCD.

13. The method of claim 1, further comprising:
    before receiving the access probe from the authorized WCD, the RAN provisioning the authorized WCD with logic that enables the authorized WCD to use reserved access channels in the RAN.

14. A method comprising:
    a wireless communication device (WCD) identifying, in a coverage area, two or more access channels that are available for use by any WCD to access a radio access network (RAN);
    the WCD carrying out a first access-channel selection process to select one of the identified two or more access channels for use to transmit access probes to the RAN;

the WCD discovering that the RAN has reserved one of the identified two or more access channels for use only by authorized WCDs due to the existence of a threshold load in the coverage area;

based on the discovery that the RAN has reserved one of the identified two or more access channels, the WCD carrying out a second access-channel selection process to select the reserved one of the identified two or more access channels for use to transmit access probes to the RAN; and the WCD sending an access probe to the RAN over the reserved one of the identified two or more access channels.

15. The method of claim 14, further comprising:

before identifying the two or more access channels that are available for use by any WCD, the WCD receiving, from the RAN, at least one available access-channel notification that identifies each of the two or more access channels as an access channel that is available for use by any WCD, wherein the WCD identifying the two or more access channels that are available for use by any WCD comprises the WCD identifying the two or more access channels based on the at least one received available access-channel notification.

16. The method of claim 15, wherein the WCD discovering that the RAN has reserved one of the identified two or more access channels for use only by authorized WCDs comprises one or both of:

the WCD receiving an updated available-access-channel notification that does not identify the reserved one of the two or more access channels as an access channel that is available for use by any WCD; and the WCD receiving a reserved-access-channel notification that identifies the reserved one or the two or more access channels as an access channel that is reserved for use only by authorized WCDs.

17. A radio access network (RAN) entity comprising:

a communication interface configured to facilitate wireless communication with wireless communication devices (WCDs) in a coverage area; and a processing unit configured to:

(i) cause the communication interface to provide, in the coverage area, two or more access channels that are available for use by any WCD, (ii) detect that a threshold load exists in the coverage area, (iii) in response to detecting that the threshold load exists, reserve one of the two or more access channels for use only by authorized WCDs, and (iv) after reserving one of the two or more access channels, cause the communication interface to receive an access probe from an authorized WCD over the reserved one of the two or more access channels.

18. The RAN entity of claim 17, wherein the processing unit is further configured to:

while causing the communication interface to provide the two or more access channels that are available for use by any WCD, cause the communication interface to publish available-access-channel notifications that identify each of the two or more access channels as an access channel that is available for use by any WCD.

19. The RAN entity of claim 17, wherein the processing unit being configured to reserve one of the two or more access channels in the coverage area for use only by authorized WCDs comprises one or both of:

the processing unit being configured to cause the communication interface to publish updated available-access-channel notifications that no longer identify the reserved one of the two or more access channels as an access channel that is available for use by any WCD; and the processing unit being configured to cause the communication interface to publish reserved-access-channel notifications that identify the reserved one or the two or more access channels as an access channel that is reserved for use only by authorized WCDs.

20. A wireless communication device (WCD) comprising:

a communication interface configured to facilitate wireless communication with a radio access network (RAN); and a processing unit configured to:

(i) identify, in a coverage area, two or more access channels that are available for use by any WCD to access the RAN, (ii) carry out a first access-channel selection process to select one of the identified two or more access channels for use to transmit access probes to the RAN, (iii) discover that the RAN has reserved one of the identified two or more access channels for use only by authorized WCDs due to the existence of a threshold load in the coverage area, (iv) based on the discovery that the RAN has reserved one of the identified two or more access channels, carry out a second access-channel selection process to select the reserved one of the identified two or more access channels for use to transmit access probes to the RAN, and (v) cause the communication interface to send an access probe to the RAN over the reserved one of the identified two or more access channels.

* * * * *